US012787064B2

(12) United States Patent
Dong

(10) Patent No.: US 12,787,064 B2
(45) Date of Patent: Nov. 3, 2026

(54) PROCESSING METHOD FOR NETWORK ALLOCATION VECTOR (NAV) TIMER AND RELATED APPARATUS

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 226 days.

(21) Appl. No.: 18/699,643

(22) PCT Filed: Oct. 15, 2021

(86) PCT No.: PCT/CN2021/124184
§ 371 (c)(1),
(2) Date: Apr. 9, 2024

(87) PCT Pub. No.: WO2023/060584
PCT Pub. Date: Apr. 20, 2023

(65) Prior Publication Data
US 2025/0234378 A1 Jul. 17, 2025

(51) Int. Cl.
*H04W 84/12* (2009.01)
*H04W 74/0816* (2024.01)

(52) U.S. Cl.
CPC ........ *H04W 74/0816* (2013.01); *H04W 84/12* (2013.01)

(58) Field of Classification Search
None
See application file for complete search history.

(56) References Cited

U.S. PATENT DOCUMENTS

2021/0084711 A1 3/2021 Park et al.
2021/0266891 A1* 8/2021 Chu ..................... H04L 5/1469
(Continued)

FOREIGN PATENT DOCUMENTS

CN 112714472 A 4/2021
CN 113068214 A 7/2021
(Continued)

OTHER PUBLICATIONS

ISA State Intellectual Property Office of the People's Republic of China, International Search Report Issued in Application No. PCT/CN2021/124184, Jan. 27, 2022, WIPO, 4 pages.
(Continued)

*Primary Examiner* — Diane L Lo
(74) *Attorney, Agent, or Firm* — Finnegan, Henderson, Farabow, Garrett & Dunner, L.L.P.

(57) ABSTRACT

A processing method for a network allocation vector (NAV) timer is performed by a Non-Access Point Multi-Link Device (Non-AP MLD). The method includes: determining a link type of a first communication link of the Non-AP MLD in an enhanced Multi-Link Single Radio (eMLSR) mode; wherein the Non-AP MLD includes the first communication link in an enabled state and a second communication link in the enabled state, the link type comprises a simultaneous transmit and receive (STR) link or a non-simultaneous transmit and receive (NSTR) link, and the second communication link includes the NSTR link that receives a target radio frame or the STR link that performs frame exchange; and performing processing on a NAV timer of the first communication link according to the link type.

13 Claims, 3 Drawing Sheets

(56) References Cited

U.S. PATENT DOCUMENTS

| | | | | |
|---|---|---|---|---|
| 2022/0418018 A1* | 12/2022 | Jang | H04W 76/15 | |
| 2023/0164831 A1* | 5/2023 | Kim | H04W 74/0808 | 370/329 |

FOREIGN PATENT DOCUMENTS

| | | | |
|---|---|---|---|
| KR | 20210122137 | A | 10/2021 |
| WO | 2021145601 | A1 | 7/2021 |
| WO | 2021201504 | A1 | 10/2021 |

OTHER PUBLICATIONS

Extended European Search Report Issued in Application No. 21960315.6 dated Dec. 4, 2024, 8 pages.

ISA State Intellectual Property Office of the People's Republic of China, Written Opinion of the International Searching Authority Issued in Application No. PCT/CN2021/124184, Jan. 27, 2022, WIPO, 6 pages.

State Intellectual Property Office of the People's Republic of China, Office Action and Search Report Issued in Application No. 2021800030096, Apr. 30, 2026, 15 pages.

* cited by examiner

PROCESSING METHOD FOR NETWORK ALLOCATION VECTOR (NAV) TIMER AND RELATED APPARATUS

CROSS-REFERENCE TO RELATED APPLICATIONS

This application is a US national stage application of International Application No. PCT/CN2021/124184, filed on Oct. 15, 2021, the content of which is hereby incorporated by reference in its entirety.

TECHNICAL FIELD

Embodiments of the present disclosure relate to the technical field of mobile communication, and in particular, to a processing method for a network allocation vector (NAV) timer and a related apparatus.

BACKGROUND

With rapid development of mobile communication technologies, wireless fidelity (Wi-Fi) technologies have made huge advances in transmission rate and throughput. Currently, content studied by Wi-Fi technology such as 320 MHz bandwidth transmission, aggregation and collaboration of multiple frequency bands, are mainly applied in application scenarios such as video transmission, augmented reality (AR), and virtual reality (VR), etc.

Specifically, aggregation and collaboration of multiple frequency bands refer to that devices communicate in 2.4 GHz, 5.8 GHz, 6 GHz, and other frequency bands at the same time, and for a scenario in which devices communicate in multiple frequency bands at the same time, a new media access control (MAC) mechanism needs to be defined for management. In addition, multi-band (multi-link) aggregation and collaboration is expected to support low-latency transmission.

Currently, in multi-band aggregation and collaboration technologies, a maximum bandwidth supported is 320 MHz (160 MHz+160 MHz), and in addition, 240 MHz (160 MHz+80 MHz) and other bandwidths supported by existing standards may also be supported.

In currently studied Wi-Fi technologies, a Non-Access Point Multi-Link Device (Non-AP MLD) in an enhanced Multi-Link Single Radio (eMLSR) mode may perform listening operation in multiple enabled links (links in an enabled state), and the Non-AP MLD may switch back to a listening state in each enabled link after frame exchange is completed in one enabled link. The Non-AP MLD may receive a frame through each enabled link, and when sensing that a channel is busy, the Non-AP MLD will set a network allocation vector (NAV) timer of the Non-AP MLD itself to identify that the channel is busy, but there is no rule about how to set NAV timers for other enabled links.

SUMMARY

Embodiments of the present disclosure provide a processing method for a network allocation vector (NAV) timer and a related apparatus, so as to provide a processing mode for the NAV timer in an eMLSR mode.

In an aspect, an embodiment of the present disclosure provides a processing method for a network allocation vector (NAV) timer, performed by a Non-Access Point Multi-Link Device (Non-AP MLD), where the method includes:

determining a link type of a first communication link of the Non-AP MLD in an enhanced Multi-Link Single Radio (eMLSR) mode; where the Non-AP MLD includes the first communication link in an enabled state and a second communication link in the enabled state, the link type includes a simultaneous transmit and receive (STR) link or a non-simultaneous transmit and receive (NSTR) link, and the second communication link includes the NSTR link that receives a target radio frame or the STR link that performs frame exchange; and performing processing on a NAV timer of the first communication link according to the link type.

In another aspect, an embodiment of the present disclosure further provides a Non-Access Point Multi-Link device, including:

a determining module, configured to determine a link type of a first communication link of the Non-AP MLD in an enhanced Multi-Link Single Radio (eMLSR) mode; where the Non-AP MLD includes the first communication link in an enabled state and a second communication link in the enabled state, the link type includes a simultaneous transmit and receive (STR) link or a non-simultaneous transmit and receive (NSTR) link, and the second communication link includes the NSTR link that receives a target radio frame or the STR link that performs frame exchange; and a processing module, configured to perform processing on a NAV timer of the first communication link according to the link type.

In another aspect, an embodiment of the present disclosure further provides a processing apparatus for a network allocation vector (NAV) timer, applied to a Non-Access Point Multi-Link Device, where the apparatus includes:

a type-determining module, configured to determine a link type of a first communication link of the Non-AP MLD in an enhanced Multi-Link Single Radio (eMLSR) mode; where the Non-AP MLD includes the first communication link in an enabled state and a second communication link in the enabled state, the link type includes a simultaneous transmit and receive (STR) link or a non-simultaneous transmit and receive (NSTR) link, and the second communication link includes the NSTR link that receives a target radio frame or the STR link that performs frame exchange; and a timer-processing module, configured to perform processing on a NAV timer of the first communication link according to the link type.

An embodiment of the present disclosure further provides an electronic device, including a memory, a processor and a computer program stored on the memory and executable by the processor, where when the computer program is executed by the processor, the processing method for the NAV timer according to any one of the above embodiments of the present disclosure is implemented.

An embodiment of the present disclosure further provides a computer-readable storage medium, storing a computer program, where when the computer program is executed by a processor, the processing method for the NAV timer according to any one of the above embodiments of the present disclosure is implemented.

In the embodiments of the present disclosure, in an eMLSR mode, a Non-AP MLD may perform listening operation in a plurality of enabled links, and the Non-AP MLD may switch back to a listening state in each enabled link after frame exchange is completed in one enabled link.

Embodiments of the present disclosure provide a method for processing NAV timers of other NSTRs in an enabled state when a Non-AP MLD in an eMLSR mode receives a target radio frame through any NSTR link in the enabled state, or a method for processing NAV timers of other STR links in an enabled state when a Non-AP MLD performs frame exchange through any one STR link in the enabled state, which has high applicability.

Additional aspects and advantages of embodiments of the present disclosure will be set forth in part in the following description, which will become apparent from the following description or be learned by practice of the present disclosure.

BRIEF DESCRIPTION OF DRAWINGS

In order to more clearly illustrate the technical solutions of the embodiments of the present disclosure, the accompanying drawings required in the description of the embodiments of the present disclosure will be briefly described below, obviously, the accompanying drawings in the following description are only some embodiments of the present disclosure, and for those skilled in the art, other accompanying drawings may also be obtained according to these accompanying drawings without making creative efforts.

DETAILED DESCRIPTION

Figure 1:
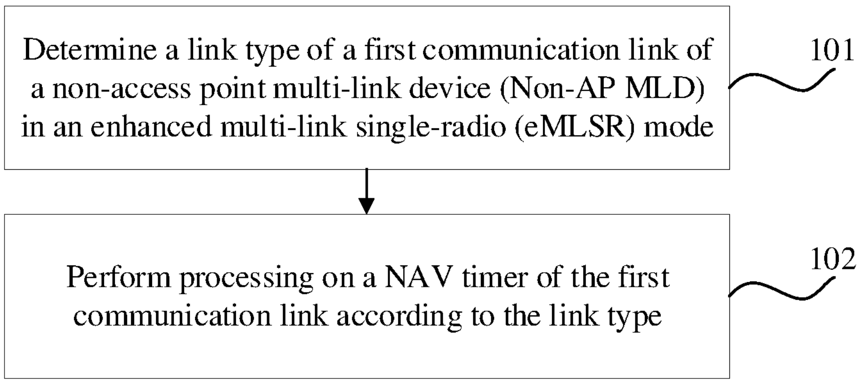
FIG. 1 is a flowchart of a processing method for a network allocation vector (NAV) timer according to an embodiment of the present disclosure.

The term "and/or" in the embodiments of the present disclosure describes an association relationship of an associated object, and indicates that there may be three relationships, for example, A and/or B may indicate three cases: A alone, A and B together, and B alone. The character "/" generally indicates that the associated object is an "or" relationship.

In the embodiments of the present disclosure, the term "a plurality of" means two or more, and other quantifiers are similar thereto.

Exemplary embodiments will be described in detail herein, examples of which are illustrated in the accompanying drawings. Unless otherwise indicated, the following description refers to the accompanying drawings in which same numerals indicate same or similar elements. The embodiments described in the following exemplary embodiments do not represent all embodiments consistent with the present disclosure. Rather, they are merely examples of apparatuses and methods consistent with some aspects of the present disclosure as detailed in the appended claims.

The terminology used in the present disclosure is for the purpose of describing particular embodiments only and is not intended to limit the present disclosure. As used in the present disclosure and the appended claims, singular forms "a", "the", and "said" are also intended to include plural forms unless the context clearly indicates other meanings. It should also be understood that the term "and/or" as used herein refers to and encompasses any or all possible combinations of one or more associated listed items.

It should be understood that although terms "first", "second", "third", etc. may be used in the present disclosure to describe various information, these information should not be limited to these terms. These terms are only used to distinguish a same type of information from each other. For example, without departing from the scope of the present disclosure, "first information" may also be referred to as "second information", and similarly, "second information" may also be referred to as "first information". Depending on context, for example, the word "if" as used herein may be interpreted as "when" or "upon" or "in response to determining".

Technical solutions in the embodiments of the present disclosure will be clearly and completely described below with reference to the accompanying drawings in the embodiments of the present disclosure, and obviously, the described embodiments are only a part of the embodiments of the present disclosure and are not all the embodiments. Based on the embodiments in the present disclosure, all other embodiments obtained by those skilled in the art without making creative efforts fall within the protection scope of the present disclosure.

Embodiments of the present disclosure provides a processing method for a network allocation vector (NAV) timer and a related apparatus, which are used for processing the NAV timer in an eMLSR mode.

The method and apparatus are based on a same application concept, and since the method and apparatus solve a problem similarly in principle, implementations of the apparatus and the method may refer to each other, and details are not repeated here.

As shown in FIG. 1, an embodiment of the present disclosure provides a processing method for a network allocation vector (NAV) timer. Optionally, the processing method can be applied to a Non-Access Point Multi-Link Device (Non-AP MLD), and the processing method may include the following steps.

Step 101: determining a link type of a first communication link of the Non-AP MLD in an enhanced multi-link single-radio (eMLSR) mode.

In the eMLSR mode, the Non-AP MLD may perform listening operation in multiple enabled communication links, and after frame exchange is completed in one enabled communication link, the Non-AP MLD may switch back to a listening state in each enabled communication link.

The Non-AP MLD may receive a radio frame in each communication link in the enabled state, and when sensing that a channel is busy, the Non-AP MLD sets a network allocation vector (NAV) timer of the Non-AP MLD itself to identify that the channel is busy. The NAV timer is used to implement virtual carrier sensing, when the NAV timer is not 0, it indicates that the channel is busy, and when the NAV timer is 0, it indicates that the channel is idle.

In the embodiments of the present disclosure, the Non-AP MLD may be a station (STA) device, and the communication link may be a communication link between an access point multi-link device (AP MLD) and the Non-AP MLD. Each communication link may be a link at a different frequency, e.g., links at 2.4 GHz, 5 GHz, 6 GHz, or several links of same or different bandwidths at 2.4 GHz. Further, there may be multiple channels in each link.

Optionally, the link type includes a simultaneous transmit and receive (STR) link or a non-simultaneous transmit and receive (NSTR) link. That is, communication links in the enabled state corresponding to the Non-AP MLD may be all STR links or all NSTR links.

When all enabled communication links corresponding to the Non-AP MLD are STR links, the Non-AP MLD is in an STR mode, that is, the Non-AP MLD can receive a radio frame sent by an AP MLD through an enabled STR link, and at the same time send a radio frame to the AP MLD through another enabled STR link. When all enabled communication links corresponding to the Non-AP MLD are NSTR links, the Non-AP MLD is in an NSTR mode, that is, at a certain moment, the Non-AP MLD can only receive a radio frame sent by the AP MLD or only send a radio frame to the AP MLD through an enabled NSTR link.

Optionally, the Non-AP MLD includes a first communication link and a second communication link that are in an enabled state, and the second communication link includes the NSTR link that receives a target radio frame or the STR link that performs frame exchange.

When link types of enabled communication links corresponding to the Non-AP MLD are all NSTR links, the second communication link is an NSTR link on which the target radio frame is received. The first communication link is a communication link other than the second communication link among enabled communication links corresponding to the Non-AP MLD.

The target radio frame is an initial control frame or a non-initial control frame (a radio frame other than the initial control frame) sent by the AP MLD. That is, the second communication link is an NSTR link that receives an initial control frame sent by the AP MLD, or is an NSTR link that receives a non-initial control frame sent by the AP MLD.

Optionally, the initial control frame may be a Multi-user Request to Send (MURTS) trigger frame or a Buffer Status Report Poll (BSRP) trigger frame.

When link types of enabled communication links corresponding to the Non-AP MLD are all STR links, since the Non-AP MLD can simultaneously receive initial control frames sent by different AP MLDs through multiple communication links, the second communication link is an STR link that performs frame exchange with the corresponding AP MLD after receiving the initial control frame. The first communication link is a communication link other than the second communication link among enabled communication links corresponding to the Non-AP MLD.

Step 102: performing processing on a NAV timer of the first communication link according to the link type.

After the enabled first communication link and second communication link corresponding to the Non-AP MLD are determined, and the link type of the first communication link is determined, processing of the NAV timer of the first communication link may be performed according to the link type of the first communication link.

In an optional embodiment, the link type of the first communication link is an STR link; and performing processing on the NAV timer of the first communication link according to the link type of the first communication link includes:

when the second communication link is the STR link that performs the frame exchange, performing processing on the NAV timer of the first communication link during a process of the frame exchange.

Each enabled communication link corresponding to the Non-AP MLD corresponds to an independent NAV timer respectively, and during operation of the Non-AP MLD, each NAV timer identifies whether a channel is busy and an occupancy time of the channel in a busy condition by using corresponding remaining duration.

When the Non-AP MLD receives the initial control frame sent by the AP MLD through the second communication link and determines to perform frame exchange with the AP MLD, processing of the NAV timer of the first communication link needs to be performed during a process of the frame exchange. In addition, during the process of the frame exchange (that is, during a process of performing processing on the NAV timer of the first communication link), the NAV timer of the first communication link is in a suspended state, so as to complete performing processing on the NAV timer during the process.

That is, when the Non-AP MLD receives the initial control frame sent by the AP MLD through any one enabled STR link, and determines to perform frame exchange with the AP MLD through the STR link, processing of NAV timers of other enabled STR links are performed during the process of the frame exchange.

In an optional embodiment, performing processing on the NAV timer of the first communication link during the process of the frame exchange includes:

determining a remaining duration of the NAV timer of the first communication link; determining a duration of the frame exchange; and performing processing on the NAV timer of the first communication link during the process of the frame exchange according to the duration of the frame exchange and the remaining duration.

That is, when processing on the NAV timers of the other enabled STR links are performed in the process of the frame exchange, for any one STR link in the other enabled STR links, a remaining duration of the NAV timer of the STR link may be determined. The remaining duration of the NAV timer of the STR link may indicate whether a channel corresponding to the STR link is busy, and indicate an occupancy time in a busy condition. The duration of the frame exchange is further determined so that processing on the NAV timer of the STR link is performed during the process of the frame exchange according to the duration of the frame exchange and the remaining duration.

In some optional embodiments, performing processing on the NAV timer of the first communication link during the process of the frame exchange according to the duration of the frame exchange and the remaining duration includes:

when the remaining duration of the NAV timer of the first communication link is greater than the duration of the frame exchange, updating the remaining duration of the NAV timer of the first communication link to a first duration during the process of the frame exchange; where the first duration is a duration difference between the remaining duration of the NAV timer of the first communication link and the duration of the frame exchange; and when the remaining duration of the NAV timer of the first communication link is less than or equal to the duration of the frame exchange, updating the remaining duration of the NAV timer of the first communication link to 0 during the process of the frame exchange.

Further, after the frame exchange with the corresponding Non-AP MLD is completed through the second communication link, the listening state may be switched to in each enabled communication link (the first communication link and the second communication link).

That is, when processing on the NAV timers of the other enabled STR links are performed during the process of the frame exchange, for a NAV timer of any one STR link in the other enabled STR links, the remaining duration of the NAV timer may be first determined.

Further, when the remaining duration of the NAV timer is greater than the duration of the frame exchange, the NAV timer is set to a suspended state in the process of the frame exchange, and the remaining duration of the NAV timer is updated to a duration difference of the remaining duration of the NAV timer and the duration of the frame exchange (the first duration) during the frame exchange process. After the process of the frame exchange is completed, a listening state is switched to under the STR link corresponding to the NAV timer, and at this time, the NAV timer is started and represents the occupancy time of the corresponding channel under the busy condition based on the updated remaining duration.

When the remaining duration of the NAV timer is less than or equal to the duration of the frame exchange, the NAV timer is set to a suspended state in the process of the frame exchange, and the remaining duration of the NAV timer is updated to 0 in the process of the frame exchange. After the process of the frame exchange is completed, a listening state is switched to in the STR link corresponding to the NAV timer, and since the remaining duration of the NAV timer is 0, it may indicate that the corresponding channel is in an idle state.

In an optional embodiment, the link type of the first communication link is an NSTR link; and performing processing on the NAV timer of the first communication link according to the link type of the first communication link includes:

- when the target radio frame received through the second communication link is an initial control frame, not updating the NAV timer of the first communication link;
- when the target radio frame received through the second communication link is a non-initial control frame, determining a process duration corresponding to the non-initial control frame, and updating the remaining duration of the NAV timer of the first communication link to the process duration.

That is, when the Non-AP MLD receives the initial control frame sent by the AP MLD through any one enabled NSTR link, there is no need to perform processing on NAV timers of other enabled NSTR links.

When the Non-AP MLD receives the non-initial control frame (another frame) sent by the AP MLD through any one enabled NSTR link, the process duration corresponding to the non-initial control frame may be first determined.

Further, for a NAV timer of any one of the other enabled NSTR links, the remaining duration of the NAV timer may be directly updated to the process duration corresponding to the non-initial control frame, and at this time, the NAV timer indicates the occupancy time of the corresponding channel in the busy condition based on the updated remaining duration.

In an optional embodiment, the Non-AP MLD needs to wait for a same time as the process duration, and then switch to the listening state in each enabled communication link (the first communication link and the second communication link).

In an optional embodiment, determining the process duration of the non-initial control frame includes at least one of:

- determining the process duration according to a duration corresponding to a duration field in a Media Access Control (MAC) frame header of the non-initial control frame; or
- determining the process duration according to a duration corresponding to a length field in a physical (PHY) layer frame header of the non-initial control frame.

As an example, when the Non-AP MLD receives the non-initial control frame sent by the AP MLD through any one enabled NSTR link, the duration corresponding to the duration field in the MAC frame header of the non-initial control frame may be determined as the process duration of the non-initial control frame.

As an example, when the Non-AP MLD receives the non-initial control frame sent by the AP MLD through any one enabled NSTR link, the duration corresponding to the length field in the physical (PHY) layer frame header of the non-initial control frame may be determined as the process duration of the non-initial control frame.

It may be understood that, when the Non-AP MLD is in the STR mode, after the frame exchange is performed through any one enabled STR link and NAV timers of other enabled STR links are updated, the Non-AP MLD may perform listening operation in each enabled STR link. After receiving the initial control frame sent by the AP MLD based on any one enabled STR link, and determining to perform frame exchange with the AP MLD, the Non-AP MLD perform processing on the NAV timers of other enabled STR links again in the process of the frame exchange based on the above implementation.

When the Non-AP MLD is in the NSTR mode, after receiving a non-initial control frame through any one enabled NSTR link and waiting for the process duration of the non-initial control frame, the Non-AP MLD performs listening operation again in each enabled NSTR link. After receiving the initial control frame through any one enabled NSTR link, the Non-AP MLD will not update NAV timers of the other enabled NSTR links; and after receiving the non-initial control frame through any one enabled NSTR link, the Non-AP MLD updates the NAV timers of the other enabled NSTR links based on the process duration of the non-initial control frame and wait for the corresponding process duration.

In the embodiments of the present disclosure, the Non-AP MLD in the eMLSR mode may update the NAV timers of other enabled NSTR links when receiving the target radio frame through any one enabled NSTR link, or may perform processing on the NAV timers of other enabled STR links when performing frame exchange through any one enabled STR link, which has high applicability.

Based on a same principle as the method provided by the embodiments of the present disclosure, the embodiments of the present disclosure further provide a Non-Access Point Multi-Link Device (Non-AP MLD), and the Non-AP MLD may be a device providing voice and/or data connectivity to a user, a handheld device having a wireless link function, or other processing devices connected to a wireless modem, or the like.

Figure 2:
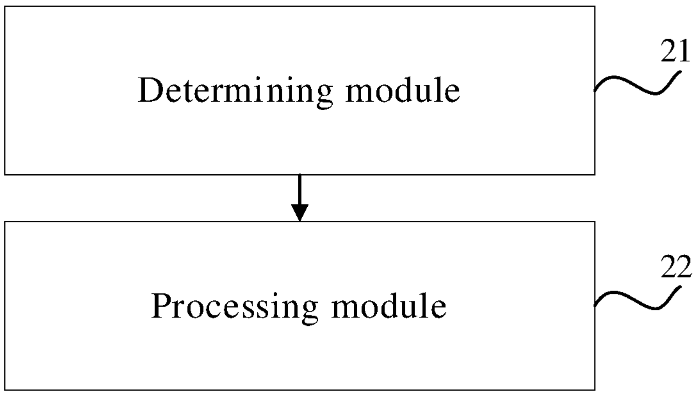
FIG. 2 is a schematic structural diagram of a processing apparatus for a network allocation vector (NAV) timer processing apparatus according to an embodiment of the present disclosure.

As shown in FIG. 2, an embodiment of the present disclosure provides a Non-AP MLD, including:

- a determining module 21, configured to determine a link type of a first communication link of the Non-AP MLD in an enhanced Multi-Link Single Radio (eMLSR) mode; where the Non-AP MLD includes the first communication link in an enabled state and a second communication link in the enabled state, the link type includes a simultaneous transmit and receive (STR) link or a non-simultaneous transmit and receive (NSTR) link, and the second communication link includes the NSTR link that receives a target radio frame or the STR link that performs frame exchange; and
- a processing module 22, configured to perform processing on a NAV timer of the first communication link according to the link type.

Optionally, in the embodiment of the present disclosure, the link type of the first communication link is the STR link; and the processing module 22 is configured to: when the second communication link is the STR link that performs the frame exchange, perform processing on the NAV timer of the first communication link during a process of the frame exchange.

Optionally, in an embodiment of the present disclosure, the processing module 22 is configured to:

determine a remaining duration of the NAV timer of the first communication link;

determine a duration of the frame exchange; and perform processing on the NAV timer of the first communication link during the process of the frame exchange according to the duration of the frame exchange and the remaining duration.

Optionally, in an embodiment of the present disclosure, the processing module 22 is configured to:

when the remaining duration is greater than the duration of the frame exchange, update the remaining duration of the NAV timer of the first communication link to a first duration during the process of the frame exchange; where the first duration is a duration difference between the remaining duration and the duration of the frame exchange; and when the remaining duration is less than or equal to the duration of the frame exchange, update the remaining duration of the NAV timer of the first communication link to 0 during the process of the frame exchange.

Optionally, in an embodiment of the present disclosure, the link type of the first communication link is the NSTR link; and the processing module 22 is configured to:

when the target radio frame is an initial control frame, the NAV timer of the first communication link is not to be updated; and when the target radio frame is a non-initial control frame, determine a process duration corresponding to the non-initial control frame, and update the remaining duration of the NAV timer of the first communication link to the process duration.

Optionally, in an embodiment of the present disclosure, the processing module 22 is configured to:

determine the process duration according to a duration corresponding to a duration field in a Media Access Control (MAC) frame header of the non-initial control frame; or determine the process duration according to a duration corresponding to a length field in a physical (PHY) layer frame header of the non-initial control frame.

Optionally, in an embodiment of the present disclosure, the processing module 22 is configured to switch to a listening state in the first communication link and the second communication link after the process of the frame exchange is completed.

Optionally, in an embodiment of the present disclosure, the processing module 22 is configured to switch to a listening state in the first communication link and the second communication link after waiting for the process duration.

In the embodiments of the present disclosure, in the eMLSR mode, the above apparatus may update the NAV timers of the other enabled NSTRs when the Non-AP MLD receives the target radio frame through any enabled NSTR link, or perform processing on the NAV timers of the other enabled STRs when the Non-AP MLD performs frame exchange through any one enabled STR link, which has high applicability.

An embodiment of the present disclosure further provides a processing apparatus for a network allocation vector (NAV) timer, applied to a Non-Access Point Multi-Link Device (Non-AP MLD), where the apparatus includes:

a type-determining module, configured to determine a link type of a first communication link of the Non-AP MLD in an enhanced Multi-Link Single Radio (eMLSR) mode; where the Non-AP MLD includes the first communication link in an enabled state and a second communication link in the enabled state, the link type includes a simultaneous transmit and receive (STR) link or a non-simultaneous transmit and receive (NSTR) link, and the second communication link includes the NSTR link that receives a target radio frame or the STR link that performs frame exchange; and a timer-processing module, configured to perform processing on a NAV timer of the first communication link according to the link type.

The processing apparatus for the network allocation vector (NAV) timer further includes another module of the Non-AP MLD in the above embodiments, and details are not repeated here.

Figure 3:
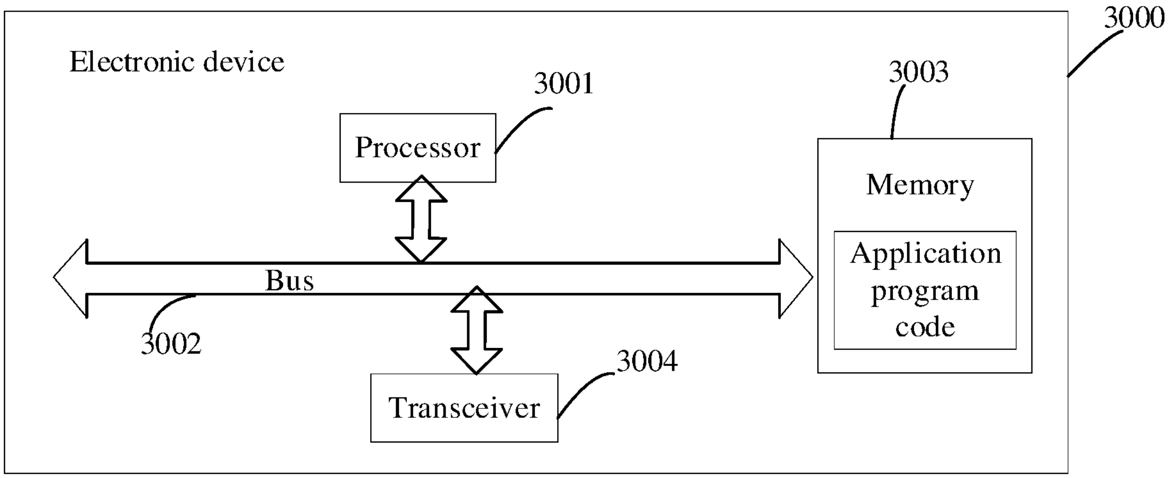
FIG. 3 is a schematic structural diagram of an electronic device provided by an embodiment of the present disclosure.

In an optional embodiment, an embodiment of the present disclosure further provides an electronic device, as shown in FIG. 3, the electronic device 3000 shown in FIG. 3 may be a server, including: a processor 3001 and a memory 3003. The processor 3001 is connected to the memory 3003, for example, by using a bus 3002. Optionally, the electronic device 3000 may further include a transceiver 3004. It should be noted that the transceiver 3004 is not limited to one in practical applications, and the structure of the electronic device 3000 does not constitute a limitation on the embodiments of the present disclosure.

The processor 3001 may be a central processing unit (CPU), a general-purpose processor, a digital signal processor (DSP), an application specific integrated circuit (ASIC), a field programmable gate array (FPGA) or another programmable logic device, a transistor logic device, a hardware component, or any combination thereof. It may implement or execute various exemplary logical blocks, modules, and circuits described in link with the present disclosure. The processor 3001 may alternatively be a combination of computing functions, for example, a combination of one or more microprocessors, or a combination of a DSP and a microprocessor.

The bus 3002 may include a path to transfer information between the above-mentioned components. The bus 3002 may be a PCI (Peripheral Component Interconnect) bus or an EISA (Extended Industry Standard Architecture) bus. The bus 3002 may be classified into an address bus, a data bus, a control bus, and the like. For ease of representation, only one thick line is used for representation in FIG. 3, but it does not mean that there is only one bus or one type of bus.

The memory 3003 may be a ROM (Read Only Memory) or another type of static storage device that can store static information and instructions, a RAM (Random Access Memory) or another type of dynamic storage device that can store information and instructions, or may be an EEPROM (Electrically Erasable Programmable Read Only Memory), a CD-ROM (Compact Disk Read Only Memory) or another optical disk storage, an optical disk storage (including a compact optical disk, a laser disk, an optical disk, a digital versatile optical disk, a Blu-ray optical disk, and the like), a magnetic disk storage medium or another magnetic storage device, or any other medium that can be used to carry or store expected program code in a form of an instruction or a data structure and that can be accessed by a computer, but is not limited thereto.

The memory 3003 is configured to store application program code for executing the solutions of the present disclosure, and the processor 3001 controls execution. The processor 3001 is configured to execute the application program code stored in the memory 3003, so as to implement content shown in the above method embodiments.

The electronic device includes, but is not limited to, a mobile terminal such as a mobile phone, a notebook computer, a digital broadcast receiver, a PDA (personal digital assistant), a PAD (tablet computer), a PMP (portable multimedia player), an in-vehicle terminal (for example, an in-vehicle navigation terminal), and a fixed terminal such as a digital TV or a desktop computer. The electronic device shown in FIG. 3 is merely an example, and should not bring any limitation to the function and scope of use of the embodiments of the present disclosure.

The server provided by the present disclosure may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. The terminal may be a smart phone, a tablet computer, a notebook computer, a desktop computer, a smart speaker, a smart watch, etc., but is not limited thereto. The terminal and the server may be directly or indirectly connected through wired or wireless communication, which is not limited in the present disclosure.

An embodiment of the present disclosure provides a computer-readable storage medium, where the computer-readable storage medium stores a computer program, and when the computer program runs on a computer, the computer can execute corresponding content in the above method embodiments.

It should be understood that although the steps in the flowchart of the accompanying drawings are sequentially shown as indicated by arrows, these steps are not necessarily sequentially performed in an order indicated by the arrows. Unless explicitly stated herein, the execution of these steps is not strictly limited in order and may be performed in other orders. In addition, at least some steps in the flowchart of the accompanying drawings may include a plurality of sub-steps or a plurality of stages, and these sub-steps or stages are not necessarily performed at the same moment, but may be performed at different moments, and the execution sequence is not necessarily performed sequentially, but may be performed alternately or alternately with at least some of the sub-steps or stages of other steps or other steps.

It should be noted that the computer-readable medium described above in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus, or device, or any combination thereof. More specific examples of the computer-readable storage medium may include, but are not limited to, an electrical link having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof. In the present disclosure, computer-readable storage medium may be any tangible medium containing or storing a program, and the program may be used by or in link with an instruction execution system, apparatus, or device. In the present disclosure, a computer-readable signal medium may include a data signal propagating in baseband or as part of a carrier wave, where computer-readable program code is carried. Such transmitted data signals may take many forms including, but not limited to, electromagnetic signals, optical signals, or any suitable combination of the foregoing. The computer readable signal medium may also be any computer readable medium other than a computer readable storage medium that can transmit, propagate, or transport programs for use by or in link with an instruction execution system, apparatus, or device. The program code embodied on the computer-readable medium may be transmitted by using any suitable medium, including but not limited to: a wire, an optical cable, RF (radio frequency), or the like, or any suitable combination of the above.

The computer-readable medium may be included in the electronic device, or may exist alone without being assembled into the electronic device.

The computer-readable medium carries one or more programs, and when the one or more programs are executed by the electronic device, the electronic device is enabled to perform the method shown in the above embodiment.

According to an aspect of the present disclosure, there is provided a computer program product or a computer program, the computer program product or the computer program including computer instructions stored in a computer readable storage medium. A processor of a computer device reads the computer instruction from the computer-readable storage medium, and the processor executes the computer instruction, so that the computer device performs the processing method for the NAV timer provided in the above various optional implementations.

Computer program code that performs the operations of the present disclosure may be written in one or more programming languages, including object-oriented programming languages such as Java, Smalltalk, C++, and conventional procedural programming languages such as the "C" language or similar programming languages. The program code may be executed entirely on the user computer, partly on the user computer, as a stand-alone software package, partly on the user computer, partly on a remote computer, or entirely on the remote computer or server. In situations involving a remote computer, the remote computer may be connected to a user computer through any kind of network, including a local area network (LAN) or a wide area network (WAN), or may be connected to an external computer (e.g., through the Internet using an Internet service provider).

The flowchart and block diagrams in the figures illustrate the architecture, functionality, and operation of possible implementations of systems, methods, and computer program products according to various embodiments of the present disclosure. In this regard, each block in a flowchart or block diagram may represent a module, segment, or portion of code containing one or more executable instructions for implementing specified logical functions. It should also be noted that in some alternative implementations, the functions noted in the blocks may also occur in a different order than those noted in the figures. For example, two successively represented blocks may in fact be executed substantially in parallel, or they may sometimes be executed in reverse order, depending on the functionality involved. It is also noted that each block in the block diagrams and/or flowcharts, and combinations of blocks in the block diagrams and/or flowcharts, may be implemented with a dedicated hardware-based system that performs the specified functions or operations, or may be implemented with a combination of dedicated hardware and computer instructions.

The modules involved in the embodiments of the present disclosure may be implemented by software or hardware. A name of a module does not constitute a limitation on the module in some cases, for example, a module A may also be described as "a module A that performs an operation B".

The above description is only preferred embodiments of the present disclosure and a description of the applied technical principle. Those skilled in the art should understand that the scope of the disclosure involved in the present disclosure is not limited to the technical solution formed by the specific combination of the above technical features, and should also cover other technical solutions formed by any combination of the above technical features or equivalent features thereof without departing from the above disclosed concept. For example, the above features and the technical features having similar functions disclosed in the present disclosure are mutually replaced to form a technical solution.

The invention claimed is:

1. A processing method for a network allocation vector (NAV) timer, performed by a Non-Access Point Multi-Link Device (Non-AP MLD), wherein the method comprises:

determining a link type of a first communication link of the Non-AP MLD in an enhanced Multi-Link Single Radio (eMLSR) mode; wherein the Non-AP MLD comprises the first communication link in an enabled state and a second communication link in the enabled state, the link type comprises a simultaneous transmit and receive (STR) link or a non-simultaneous transmit and receive (NSTR) link, and the second communication link comprises the NSTR link that receives a target radio frame or the STR link that performs frame exchange; and performing processing on a NAV timer of the first communication link according to the link type;

wherein when the link type of the first communication link is the STR link, performing processing on the NAV timer of the first communication link according to the link type comprises:

when the second communication link is the STR link that performs the frame exchange, performing processing on the NAV timer of the first communication link during a process of the frame exchange;

wherein performing processing on the NAV timer of the first communication link during the process of the frame exchange comprises:

determining a remaining duration of the NAV timer of the first communication link;

determining a duration of the frame exchange; and performing processing on the NAV timer of the first communication link during the process of the frame exchange according to the duration of the frame exchange and the remaining duration;

wherein when the link type of the first communication link is the NSTR link, performing processing on the NAV timer of the first communication link according to the link type comprises:

when the target radio frame is an initial control frame, not updating the NAV timer of the first communication link; and when the target radio frame is a non-initial control frame, determining a process duration corresponding to the non-initial control frame, and updating the remaining duration of the NAV timer of the first communication link to the process duration.

2. The method according to claim 1, wherein performing processing on the NAV timer of the first communication link during the process of the frame exchange according to the duration of the frame exchange and the remaining duration comprises:

when the remaining duration is greater than the duration of the frame exchange, updating the remaining duration of the NAV timer of the first communication link to a first duration during the process of the frame exchange; wherein the first duration is a duration difference between the remaining duration and the duration of the frame exchange; and when the remaining duration is less than or equal to the duration of the frame exchange, updating the remaining duration of the NAV timer of the first communication link to 0 during the process of the frame exchange.

3. The method according to claim 1, wherein determining the process duration corresponding to the non-initial control frame comprises at least one of:

determining the process duration according to a duration corresponding to a duration field in a Media Access Control (MAC) frame header of the non-initial control frame; or determining the process duration according to a duration corresponding to a length field in a physical (PHY) layer frame header of the non-initial control frame.

4. The method according to claim 1, wherein the method further comprises:

after the process of the frame exchange is completed, switching to a listening state in the first communication link and the second communication link.

5. The method according to claim 1, wherein the method further comprises:

after waiting for the process duration, switching to a listening state in the first communication link and the second communication link.

6. A Non-Access Point Multi-Link Device (Non-AP MLD), comprising:

a processor; and a memory storing instructions executable by the processor, wherein the processor is configured to:

determine a link type of a first communication link of the Non-AP MLD in an enhanced Multi-Link Single Radio (eMLSR) mode; wherein the Non-AP MLD comprises the first communication link in an enabled state and a second communication link in the enabled state, the link type comprises a simultaneous transmit and receive (STR) link or a non-simultaneous transmit and receive (NSTR) link, and the second communication link comprises the NSTR link that receives a target radio frame or the STR link that performs frame exchange; and perform processing on a NAV timer of the first communication link according to the link type;

wherein when the link type of the first communication link is the STR link, the processor is configured to:

when the second communication link is the STR link that performs the frame exchange, perform processing on the NAV timer of the first communication link during a process of the frame exchange;

wherein the processor is further configured to:

determine a remaining duration of the NAV timer of the first communication link;

determine a duration of the frame exchange; and perform processing on the NAV timer of the first communication link during the process of the frame exchange according to the duration of the frame exchange and the remaining duration;

wherein when the link type of the first communication link is the NSTR link, the processor is configured to:

when the target radio frame is an initial control frame, not update the NAV timer of the first communication link; and when the target radio frame is a non-initial control frame, determine a process duration corresponding to the non-initial control frame, and update the remaining duration of the NAV timer of the first communication link to the process duration.

7. The Non-AP MLD according to claim 6, wherein the processor is further configured to:

when the remaining duration is greater than the duration of the frame exchange, update the remaining duration of the NAV timer of the first communication link to a first duration during the process of the frame exchange; wherein the first duration is a duration difference between the remaining duration and the duration of the frame exchange; and when the remaining duration is less than or equal to the duration of the frame exchange, update the remaining duration of the NAV timer of the first communication link to 0 during the process of the frame exchange.

8. The Non-AP MLD according to claim 6, wherein the processor is further configured to:

determine the process duration according to a duration corresponding to a duration field in a Media Access Control (MAC) frame header of the non-initial control frame; or determine the process duration according to a duration corresponding to a length field in a physical (PHY) layer frame header of the non-initial control frame.

9. The Non-AP MLD according to claim 6, wherein the processor is further configured to:

after the process of the frame exchange is completed, switch to a listening state in the first communication link and the second communication link.

10. The Non-AP MLD according to claim 6, wherein the processor is further configured to:

after waiting for the process duration, switch to a listening state in the first communication link and the second communication link.

11. A processing apparatus for a network allocation vector (NAV) timer, applied to a Non-Access Point Multi-Link Device (Non-AP MLD), wherein the processing apparatus comprises:

a processor; and a memory storing instructions executable by the processor, wherein the processor is configured to:

determine a link type of a first communication link of the Non-AP MLD in an enhanced Multi-Link Single Radio (eMLSR) mode; wherein the Non-AP MLD comprises the first communication link in an enabled state and a second communication link in the enabled state, the link type comprises a simultaneous transmit and receive (STR) link or a non-simultaneous transmit and receive (NSTR) link, and the second communication link comprises the NSTR link that receives a target radio frame or the STR link that performs frame exchange; and perform processing on a NAV timer of the first communication link according to the link type;

wherein when the link type of the first communication link is the STR link, the processor is configured to:

when the second communication link is the STR link that performs the frame exchange, perform processing on the NAV timer of the first communication link during a process of the frame exchange;

wherein the processor is further configured to:

determine a remaining duration of the NAV timer of the first communication link;

determine a duration of the frame exchange; and perform processing on the NAV timer of the first communication link during the process of the frame exchange according to the duration of the frame exchange and the remaining duration;

wherein when the link type of the first communication link is the NSTR link, the processor is configured to:

when the target radio frame is an initial control frame, not update the NAV timer of the first communication link; and when the target radio frame is a non-initial control frame, determine a process duration corresponding to the non-initial control frame, and update the remaining duration of the NAV timer of the first communication link to the process duration.

12. An electronic device, comprising:

a processor; and a memory storing a computer program executable by the processor, wherein when the computer program is executed by the processor, the processor performs the method according to claim 1.

13. A non-transitory computer-readable storage medium, storing a computer program, wherein when the computer program is executed by a processor, the processor is caused to perform the method according to claim 1.

* * * * *